United States Patent
Rameshkumar et al.

(10) Patent No.: US 10,089,285 B2
(45) Date of Patent: Oct. 2, 2018

(54) METHOD TO AUTOMATICALLY CONVERT PROPOSAL DOCUMENTS

(71) Applicant: RFPIO, INC., Beaverton, OR (US)

(72) Inventors: Ganesh Shankar C. Rameshkumar, Beaverton, OR (US); Manish K. Bafna, Tamil Nadu (IN); Sankar Lagudu, Portland, OR (US); A J Sunder, Portland, OR (US)

(73) Assignee: RFPIO, INC., Beaverton, OR (US)

( * ) Notice: Subject to any disclaimer, the term of this patent is extended or adjusted under 35 U.S.C. 154(b) by 0 days.

(21) Appl. No.: 15/379,015

(22) Filed: Dec. 14, 2016

(65) Prior Publication Data

US 2018/0165257 A1     Jun. 14, 2018

(51) Int. Cl.
| | |
|---|---|
| G06F 17/00 | (2006.01) |
| G06F 17/22 | (2006.01) |
| G06F 17/21 | (2006.01) |
| G06F 17/24 | (2006.01) |

(52) U.S. Cl.
CPC .......... *G06F 17/227* (2013.01); *G06F 17/218* (2013.01); *G06F 17/2247* (2013.01); *G06F 17/248* (2013.01)

(58) Field of Classification Search
CPC ..... G06F 17/211; G06F 17/212; G06F 17/248
See application file for complete search history.

(56) References Cited

U.S. PATENT DOCUMENTS

| | | | | |
|---|---|---|---|---|
| 5,860,073 A | * | 1/1999 | Ferrel | G06F 17/218 715/255 |
| 6,748,569 B1 | * | 6/2004 | Brooke | G06F 17/2247 707/999.001 |
| 8,108,377 B2 | * | 1/2012 | Jiang | G06F 17/30905 707/705 |
| 8,164,596 B1 | * | 4/2012 | Bech | G06T 13/00 345/473 |
| 9,225,745 B2 | * | 12/2015 | Riley | H04L 63/20 |
| 2001/0032217 A1 | * | 10/2001 | Huang | G06F 17/218 715/239 |
| 2002/0149618 A1 | * | 10/2002 | Estrada | G06Q 10/10 715/760 |
| 2007/0226612 A1 | * | 9/2007 | Sun | G06F 17/30905 715/210 |
| 2008/0037789 A1 | * | 2/2008 | Motohashi | G06F 21/6227 380/277 |
| 2010/0088239 A1 | * | 4/2010 | Blair | G06F 17/227 705/80 |
| 2012/0005429 A1 | * | 1/2012 | Kalasapur | G06F 17/30899 711/118 |

(Continued)

*Primary Examiner* — Laurie A Ries
(74) *Attorney, Agent, or Firm* — Miller Nash Graham & Dunn LLP

(57) ABSTRACT

A computer-controlled method of converting documents includes receiving, through a user interface on a computing device, a name of a request document representing a request for proposal stored in a memory, using a processor in the computing device to access the memory and locate a cascading style sheet associated with an application used to produce the request document in the memory, importing the cascading style sheet from the memory and processing information in the cascading style sheet as a text mark-up file, and populating the user interface with the information.

7 Claims, 8 Drawing Sheets

(56) References Cited

U.S. PATENT DOCUMENTS

| | | | | |
|---|---|---|---|---|
| 2013/0167001 A1* | 6/2013 | De Angelis | ....... | G06F 17/30861 |
| | | | | 715/211 |
| 2013/0339101 A1* | 12/2013 | Riley | ................. | G06Q 10/0637 |
| | | | | 705/7.36 |
| 2014/0281880 A1* | 9/2014 | Sachs | .................... | G06F 17/218 |
| | | | | 715/234 |
| 2015/0046794 A1* | 2/2015 | Cardno | ................ | G06F 17/218 |
| | | | | 715/235 |
| 2015/0317290 A1* | 11/2015 | Ahmed | ............ | G06F 17/30893 |
| | | | | 715/234 |
| 2016/0275052 A1* | 9/2016 | Eicholz | ................ | G06F 17/227 |
| 2017/0132313 A1* | 5/2017 | Kukla | ............... | G06F 17/30675 |
| 2017/0185754 A1* | 6/2017 | Jefferson | ................. | G06F 21/10 |

* cited by examiner

METHOD TO AUTOMATICALLY CONVERT PROPOSAL DOCUMENTS

BACKGROUND

Many different organizations want to acquire goods and services, and many of them have procurement policies and bidding processes. These organizations solicit proposals for the goods and services by sending out requests for proposals, or RFPs. The RFPs typically have sections and subsections that the bidding organization must complete.

When the RFP responding organization, someone typically divides it up and sends it to the various people that must fill out each section. Once they have all completed their sections, someone must reassemble all the pieces into a unified document for submission.

This process can consume large amounts of time, resources and have redundant information submitted by multiple people. The person gathering the information from various people must weed out the redundant information, which takes up even more time. The final document must be formatted into a single, cohesive document and then submitted back to the soliciting organization.

BRIEF DESCRIPTION OF THE DRAWINGS

FIGS. 6-13 show an example of processing a spreadsheet RFP document.

DETAILED DESCRIPTION OF THE EMBODIMENTS

When an organization that desired to procure services or goods, it may publish a request for proposal (RFP) document. The term RFP typically applies to Request For Proposals, but as used here will include Request for Quotation (RFQ) and Requests for Information (RFI). The term 'document' as used here encompasses any file that organizes information and allows information to be added and edited. The RFP, referred to here as the requesting document, may take many forms including a word processor document such as a Microsoft® Word®, a spreadsheet such as Excel®, an email such as an Outlook® message, or even a set of documents of mixed types.

Similarly, the RFP and items associated with the request may be referred to as the 'requesting document.' The proposal, and the responses contained within the proposal may be referred to as the 'responding' or 'response' document. The organization publishing the RFP may be referred to as the requesting organization, and the organizations submitting proposals may be referred to as the 'responding' or 'proposing' organization.

The responding organization that wants to submit a proposal typically has to manually divide up the document into areas of responsibilities or by the people who have the required information. Some processing applications do exist for managing this process, both general work sharing applications, and other applications specific to RFPs. Currently, these applications require some level of manual entry to get the various sections and portions of the RFP into the application format.

However, embodiments here utilize a computer to automatically import the information from the requesting document, replicating the breakdown of topics, sections and questions/requirements. Users having the needed information can input the information through the user interface or interfaces. The completed proposal information is then converted back to a unified document containing all the information in a consolidated, uniform document in the application or applications in which the requesting organization desires.

Figure 1:
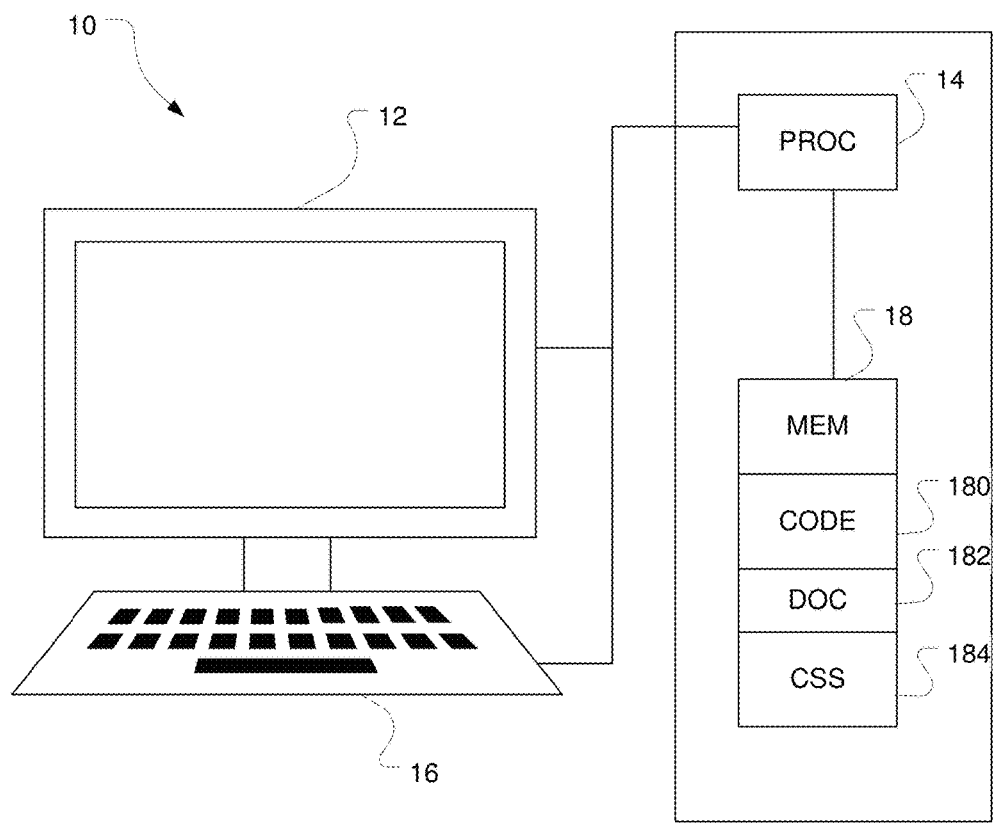
FIG. 1 shows a computer system used for converting documents.

FIG. 1 shows a computer system that operates to convert a request document to populate a user interface, receives information through the user interface and then converts it to a response document. The system 10 has a user interface device 12 that allows the processor 14 to display and request information from the user. The system also includes a user input device. In the embodiment here, the input device comprises a keyboard 16, but the user interface device 12 may include input capabilities such as a touch screen.

The computer system 10 includes a source application in the form of executable code, typically stored in the memory 18. The memory 18 also stores the requesting document 182. The requesting document may come in a format that includes a cascading style sheet 184, as well as a format native to the source application in which the document was produces 182, or may just reside in cascading style sheet format. Similarly, the memory in which the code is stored may be different than the memory used to store the requesting document. The embodiments here include these variations and do not imply any limitation to one or the other.

Figure 2:
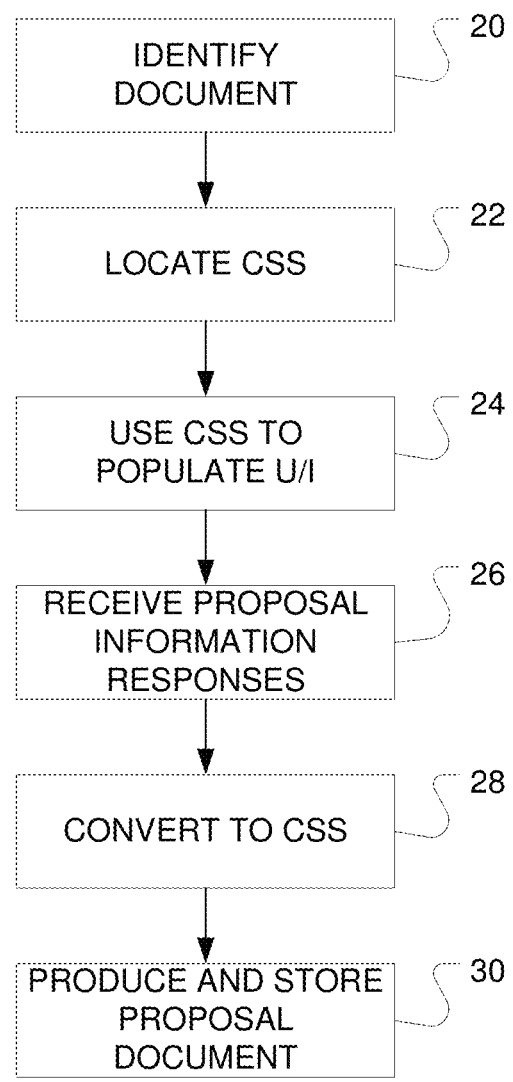
FIG. 2 shows a flowchart of one embodiment of a method of converting documents.

Using the embodiments here, the computer converts information contained in a requesting document into a user interface usable by multiple users to provide the response information. The term 'information' used here means the text embodying the questions and requests within the cascade style sheet. FIG. 2 shows a flowchart of an embodiment of this process. At 20, the process identifies the requesting document. This may occur through the processor executing code that presents the user with a user interface requesting the name of the requesting document. The processor then executes code that causes the processor to access a memory in which the document is stored at 22. The document has what is referred to as a 'cascading style sheet' (CSS) associated with it. The document may have multiple files associated with it, generated by the application in which the document was created, but the CSS is what is of interest here.

Figure 3:
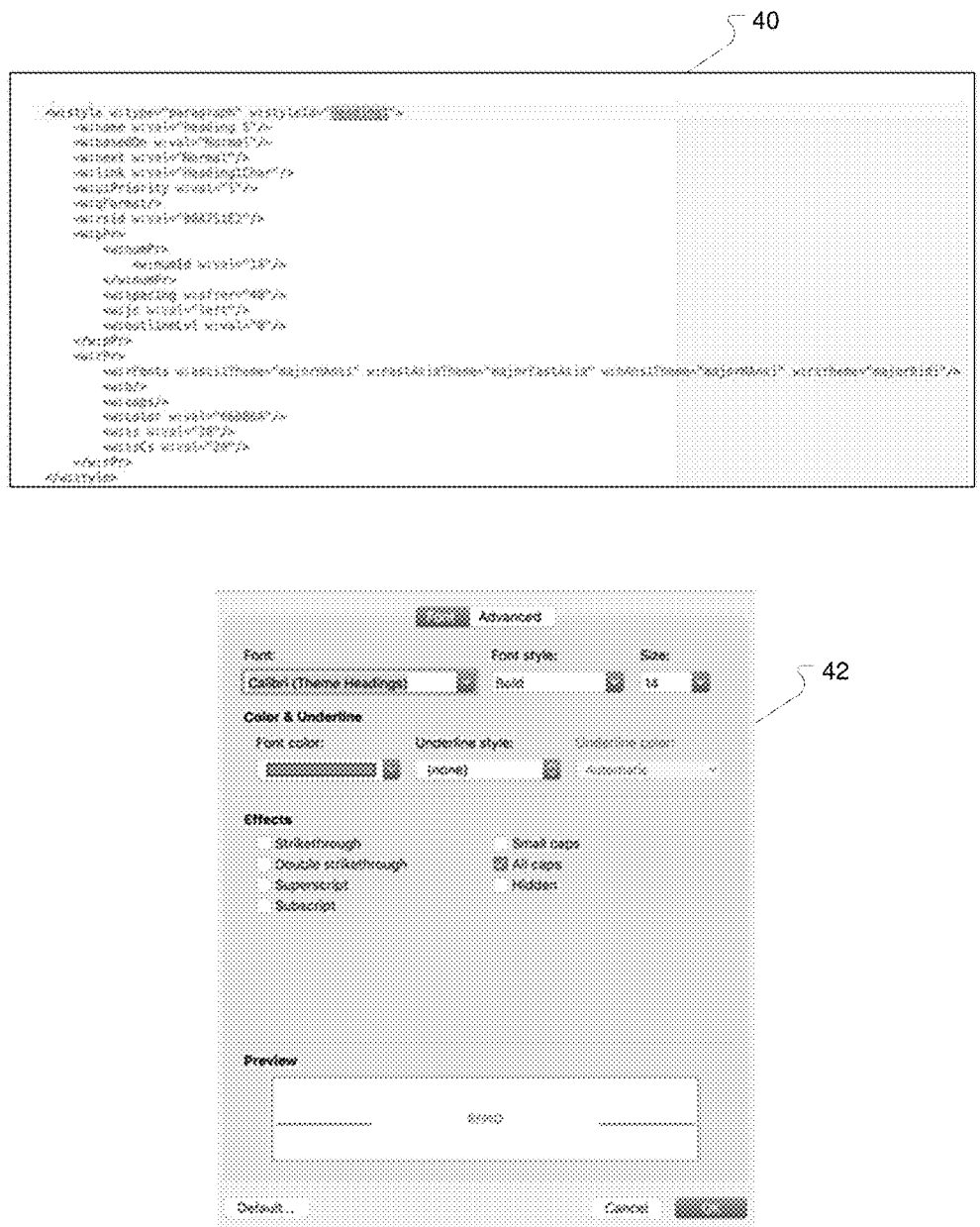
FIG. 3 shows a portion of text displayed from within a source application and its corresponding cascading style sheet.

A cascading style sheet, as currently used, is an HTML representation of a document and sets out the format, colors, fonts, etc., of how a document is to appear. FIG. 3 shows an example of the data contained in a CSS at 40 and its resulting web page display. Many programs store a document as a CSS. User inputs received in the window 42 of FIG. 3 are then stored to allow application of that formatting to the text of the document.

Figures 4, 5:
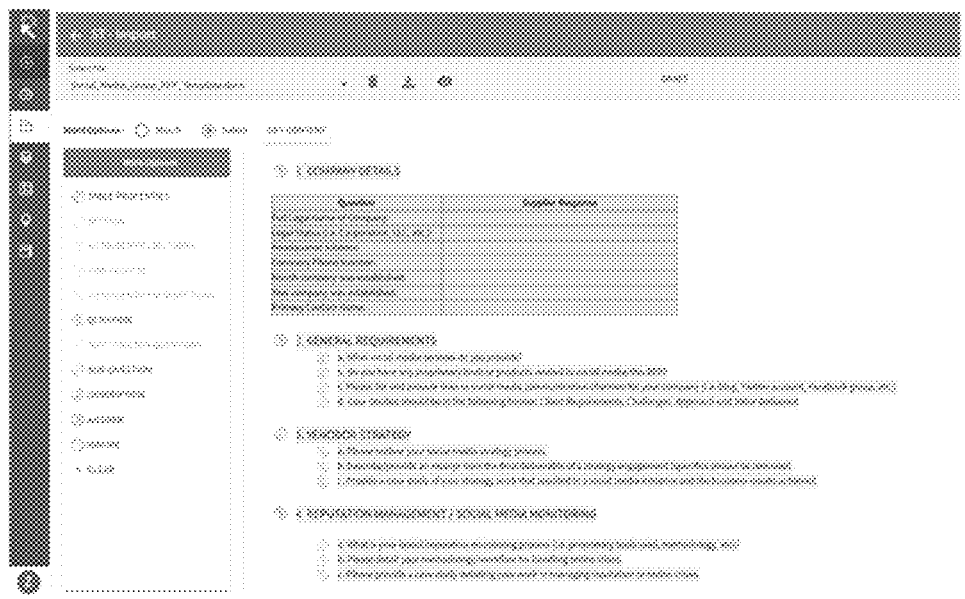
FIG. 4 shows a displayed interface and its corresponding text mark-up file.
FIG. 5 shows an embodiment of a first level user interface generated from an RFP document.

FIG. 4 shows a portion of text 50 generated by a word processing application such as MS-Word® and its associated CSS entries 52 defining the color, font, format, etc. of the text. These selections are made through the user interface of FIG. 3 and then applied to the text of FIG. 4.

Returning to FIG. 2, the information contained in the CSS found at 22 populates a user interface 24 to 'import' the RFP information for further operations. For example, an RFP may have the following sections and questions:

1. Company Information

| Question | Supplied Response |
|---|---|
| Full Legal Name of Company | |
| Legal Status (i.e. Corporation, LLC, etc.) | |
| Headquarters Address | |
| Company Phone Number | |
| Month company was established | |
| Year company was established | |
| Primary Contact Name | |

2. General Requirements
   a. What social media services do you provide?
   b. . . .
   .
   .
   .
3. Vendor Strategy
   a. . . .
4. Reputation Management/Social Media Monitoring
   a. . . .

For example, assume this document was received in MS-Word® format. The receiving organization would have to divvy up the different sections, send them via email or electronic repository or shared drive to the appropriate recipients, etc. Then, when all the responses were completed, someone would have to compile them all into the appropriate form of document, ensure that all the formatting such as headings, font, bullet, etc., were correct and consistent, and then save it as the completed proposal.

However, using the embodiments here, the document is converted into an HTML format with all the appropriate settings, and as 'active' links, as shown in FIG. 5. This converted document then undergoes processing as needed by the appropriate people at organization that is going to submit the proposal. The user may be provided the ability to mark the content as Sections, Sub-Sections, Questions, Sub-Questions, Description and Answers using, for example, the Mark Options tool shown to the left of FIG. 5 as Mark Options.

Further optional processes then may occur. For example, the appropriate people may enter the information they have through the user interface presented to them, similar if different from the one in FIG. 5, to receive proposal information at 26 in FIG. 2. This user interface may occur multiple times as different people work on it, or the other people may send their answers to one person who inputs their answers into the user interface, or a mix between the two.

Figure 6:
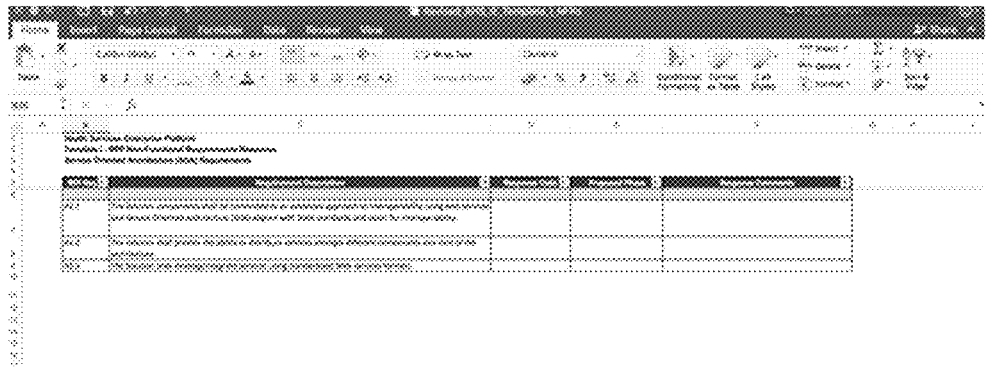

The above discussion involves a word processing document. Processing of spreadsheets occurs slightly differently, as the grid-like nature of spreadsheets with columns and lines requires different handling. FIG. 6 shows an example of an RFP in spreadsheet form. The formatting and linking within spreadsheets may be a little more complicated, so the user may desire more control. In the embodiments of FIG. 7-12, more user input is used prior to the processing of the style sheets into the user interface.

Figure 7:
Figure 10:
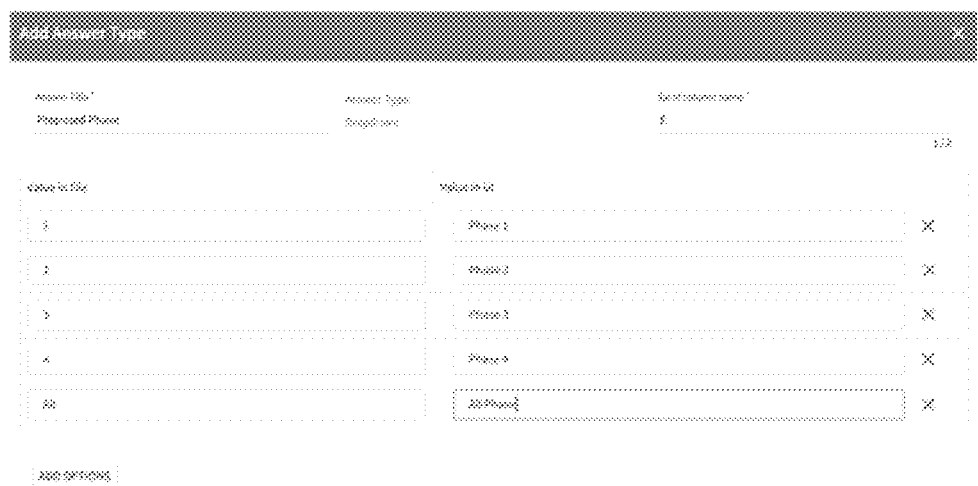

In FIG. 6, the RFP has 3 requirements, AL.1 through AL.3, shown on the left side. The requirements then have a description, and then a response code and proposed phase. The response code may require manual entry, or the program may be able to derive it from the text. In FIG. 7, a user interface is presented to the user that allows some user controlled configuration to specify a way the style sheet is to be converted. In this embodiment, the RFP has multiple spreadsheets within the spreadsheet workbook. In this embodiment, the user interface allows the user to designate each sheet as a section as shown in FIG. 7.

Figures 8, 9:
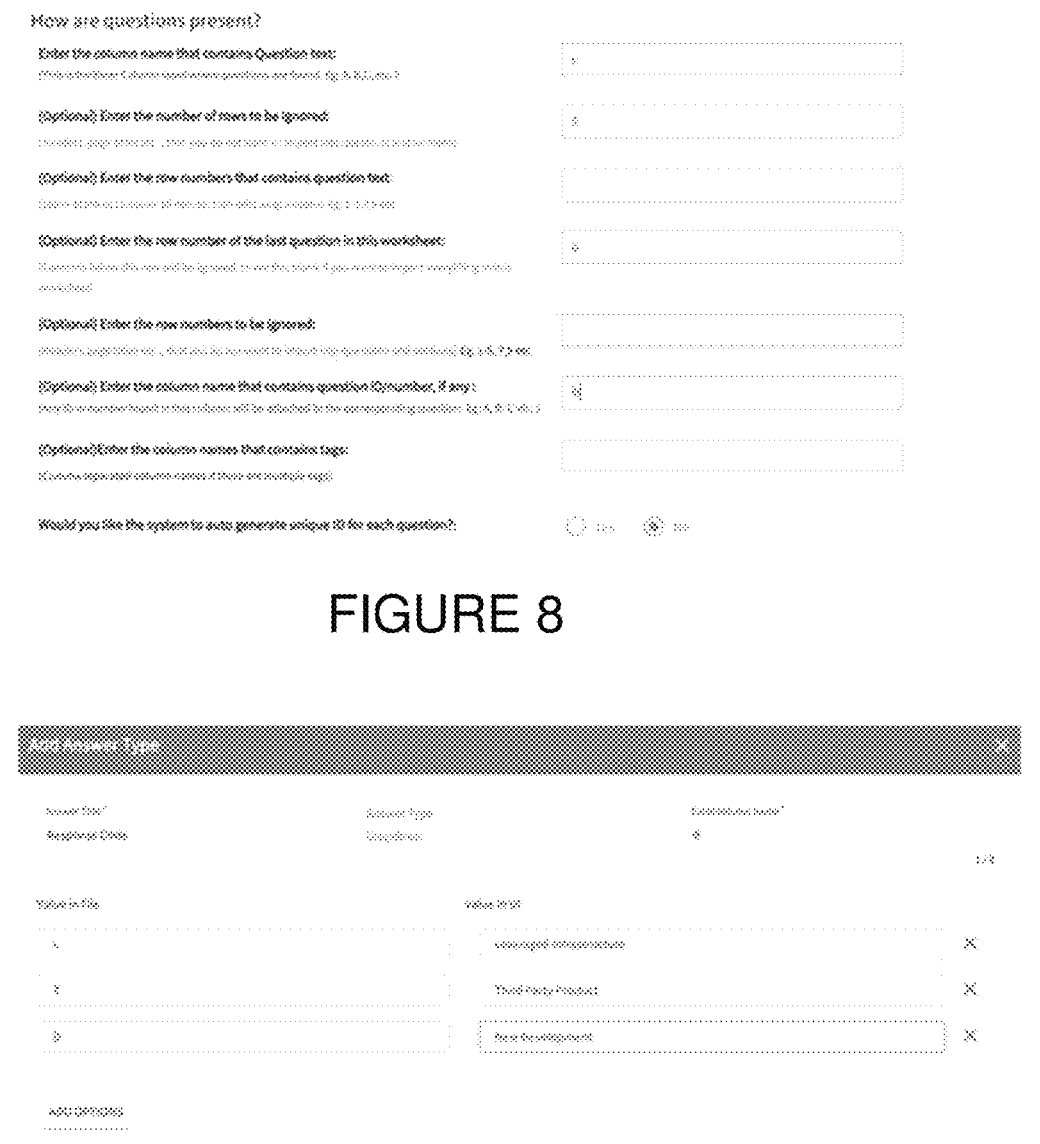

The RFP may have the questions laid out in starting in cells other than cell A1, the user may designate at what column or cell the questions begin. Other embodiments include an automated parser that parses the text in the cells to identify the first question or query and then processes the sheet from there. As can be seen in FIG. 8, the user can designate in which column the questions start as well as other parameters to allow the process to accurately locate the information when converting the CSS.

Figure 11:
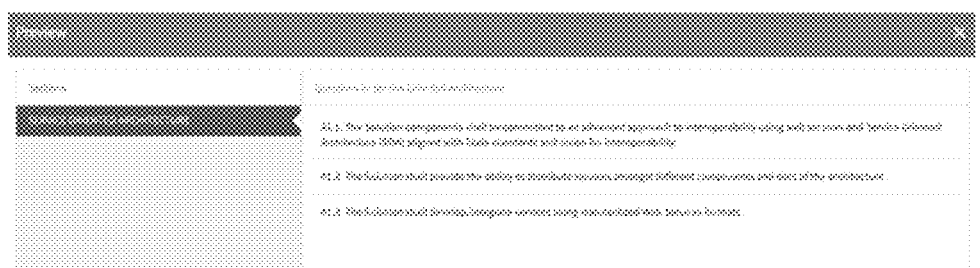

In FIGS. 8 and 9 the user may create a key to allow the process to identify the values in the files and correlate them to the user interface. FIG. 9 allows codes to be added that identified key words in the user interface, and in FIG. 10 the single digit numbers are correlated to the phases of the project being responded to in the RFP. FIG. 11 shows a preview of the processed CSS as a user interface. This allows the user to check the accuracy. As mentioned above, this formatting and locating may be done with an automated parser, but even in that instance the user may be presented with a 'check' sheet to allow the user to check accuracy.

Figure 12:
Figure 13:
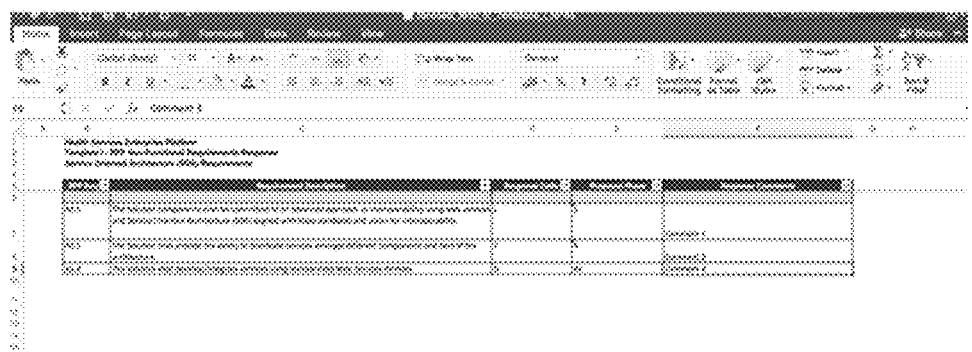

Once the user has made the identifying inputs as shown in FIG. 12, the process performs the conversion previously mentioned to create the user interfaces to be used in receiving the response information in FIG. 13.

As shown at 28 shown in FIG. 2, when the process has gathered all the information needed, the information is converted and stored as the cascading style sheet in the format needed for the application that generates the proposal document. For example, the RFP document may request that the proposal in response to the request be a MS-Word® or Excel® document. The CSS generated during the processing of the RFP would then be stored in that format at 30 in FIG. 2 for transmission back to the requesting organization. FIG. 11 shows an example of a response document for a spreadsheet generated RFP.

In this manner, a document that would otherwise must be manually broken up and/or entered an RFP management application program, is imported, and automatically set up for processing. This reduces the amount of time it takes for an organization to generate a proposal, as well as ensuring the final document is unified in its formatting and saved as the appropriate type of document.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A computer-controlled method of converting documents, comprising:
   receiving, through a user interface on a computing device, a name of a request document representing a request for proposal stored in a memory;
   using a processor in the computing device to access the memory and locate a first cascading style sheet associated with an application used to produce the request document in the memory;

importing the first cascading style sheet from the memory and processing information in the first cascading style sheet as a text mark-up file;

populating the user interface with the information from the text mark-up file;

receiving response information through the user interface in response to the populated information from the text mark-up file;

converting the information and the response information into a second cascading style sheet; and producing a proposal document in a second application based on the second cascading style sheet.

2. The method of claim 1, wherein receiving the response information comprises receiving the response information through multiple user interfaces.

3. The method of claim 1, wherein the application and the second application are the same application.

4. The method of claim 1, wherein the application and the second application are different applications.

5. The method of claim 1, wherein the application comprises one of a word processor, a spreadsheet, and an email program.

6. The method of claim 1, wherein the text mark-up file comprises one of either a hypertext mark-up file or an extended mark-up file.

7. The method of claim 1, wherein the user interface is a first user interface, and wherein importing the cascading style sheet comprises:

providing a second user interface to allow a user to mark the content; and using the inputs from the second user interface in processing the cascading style sheet.

\* \* \* \* \*